Patented Oct. 17, 1944

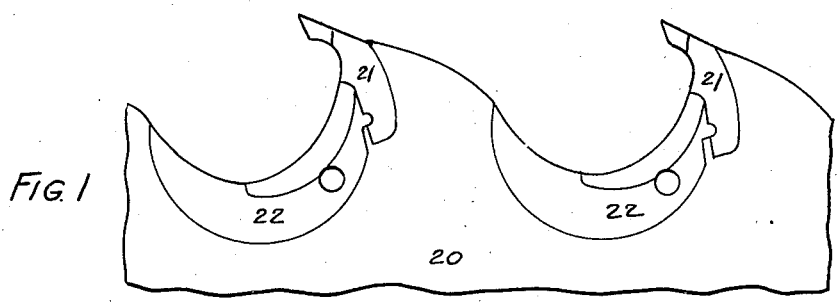
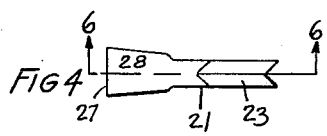
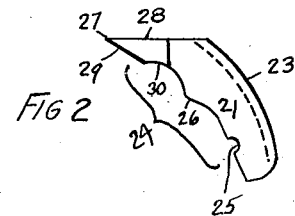
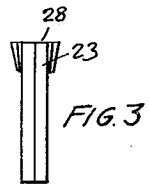
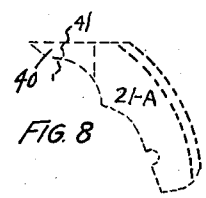
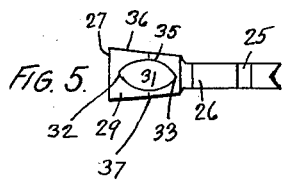
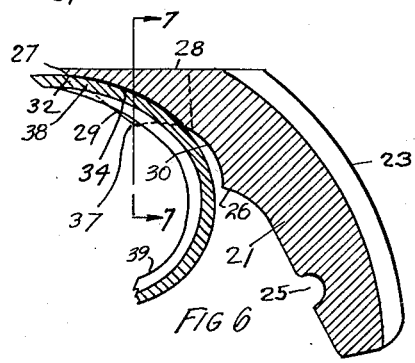
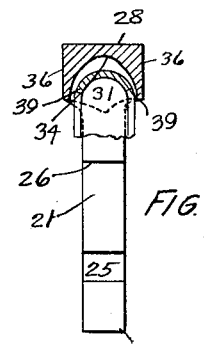

2,360,336

UNITED STATES PATENT OFFICE 2,360,336

HOLLOW THROAT SAW BIT

William E. Gibbs, Milwaukie, Oreg.

Application October 18, 1941, Serial No. 415,572

1 Claim. (Cl. 143—141)

This invention relates generally to saws and particularly to saws having insert teeth of the type described in my United States Patents, Nos. 2,024,520, and 2,127,112.

The main object of this invention is to construct a tooth which will be stronger across the throat of the tooth and offer less resistance to the cutting action thereof than is the conventional tooth.

The second object is to construct a saw tooth which will permit the use of a more acute tooth angle without detracting from the tooth strength.

The third object is to construct a saw tooth which will be especially adapted for cutting knotty or curly grained wood by reason of the fact that the chips are cut rather than torn along the sides of the cut as is commonly the case particularly in heavy feeds.

The fourth object is to construct a saw tooth with a channel shaped cross section wherein the interior of the channel is somewhat rounded transversely and grooved longitudinally to provide free passage and escape for the chips being formed.

These and other objects are accomplished in the manner set forth in the following specification, as illustrated in the accompanying drawing, in which:

Fig. 1 is a fragmentary side elevation of a saw equipped with my improved teeth.

Fig. 2 is a side elevation of my improved saw tooth.

Fig. 3 is an end elevation of Fig. 2 showing the groove.

Fig. 4 is a plan of Fig. 2.

Fig. 5 is a bottom view of Fig. 2.

Fig. 6 is a section taken along the line 6—6 in Fig. 4.

Fig. 7 is a transverse section taken along the line 7—7 in Fig. 6.

Fig. 8 is a side elevation showing in dotted lines a prior art tooth.

Fig. 9 is a plan of Fig. 8, also in dotted lines.

Fig. 10 is a bottom view of Fig. 8, also in dotted lines.

Similar numerals refer to similar parts throughout the several views.

Referring in detail to the drawing, there is shown in Fig. 1, a saw blade 20 of the type provided with insert teeth 21, which are held in place by means of the lock 22. Each tooth 21 is provided with a curved, grooved back 23 while its front edge 24 is somewhat irregular and is provided with a locking groove 25 and a locking shoulder 26. The cutting edge 27 is somewhat wider than is the body of the tooth 21.

The outer face 28 is preferably straight and ground. The inner face 29 forms an acute angle with the face 28 having its apex at the cutting edge 27. The inner face 29 is also ground and extends to the chip relieving curve 30 which in turn extends to the locking shoulder 26. The inner face 29 is the sharpening face.

The main feature of my invention resides in the presence of the transversely and longitudinally curved groove 31 whose foremost end 32 extends almost to the cutting edge 27 and whose rearmost end 33 extends almost to the chip relieving curve 30.

A bottom 34 of the groove 31 is close to the face 28 and forms a thin point with relation thereto along the middle plane of the tooth 21.

The sides 35 of the groove 31 extend close to the sides 36, leaving the points 37 relatively narrow.

It will be noted in the section shown in Fig. 6, that the chips which are cut by the straight edge 27 are slightly curved due to the fact that the intermediate portion 38 curves into the groove 31 while the exterior portions 39 are drawn together thereby.

It will be seen from this that this form of tooth is especially well adapted to heavy feeding and to the cutting of knotty or curly grained wood which would ordinarily destroy the conventional tooth wherein no reinforcement is provided for the tooth structure.

It will also be seen that the tooth that I have illustrated offers less resistance to the cutting action by reason of the central groove 31 and provides greater strength to the tooth through the increased depth of the throat.

It will be noted that when comparing the teeth illustrated in Figs. 1 to 7 inclusive with the prior art teeth shown in dotted lines in Figs. 8 to 10 that I obtain a thin average point and at the same time greatly increase the rigidity and strength of the tooth throat by making the portions strong due to the channel shaped construction and at the same time lessening the load on the throat for a given task.

It is a matter of common knowledge that in the conventional tooth 21—A shown in Figs. 8 to 10, the point 40 is made as thin as possible causing it to be easily broken along the line 41 when knots or hard cutting or heavy feeding is encountered.

With my tooth, reinforcement is provided at the inherently weak points and the average thickness of the points is reduced by the groove which, as stated, greatly improves the cutting action of the saw itself.

It is, of course, a well known fact that a variety of cutters have been made in the past having relieved or broken faced teeth for the purpose of improving the cutting action or for changing the shape of the cut being formed, but in the present instance, the combination of increasing thickness of the tooth sides and reduced average thickness of the points brings about a very desirable change in the tooth structure and operation.

I claim:

An insert saw tooth having a holding shank on one end of which is formed a straight chisel shaped cutting edge, the outer face of said edge being planar, and the sharpening inner face of said edge forming an acute angle with relation to the outer face, the inner face and said shank being connected by a chip relieving curve, the junction of said sharpening face and chip relieving curve having formed therein a transversely and longitudinally curved groove extending from a point near the cutting edge of the tooth to a point near the middle of said chip relieving curve.

WILLIAM E. GIBBS.